G. A. JULIUS.
RACE TOTALIZATOR.
APPLICATION FILED APR. 30, 1919.

1,409,216.

Patented Mar. 14, 1922.
5 SHEETS—SHEET 3.

INVENTOR:
George Alfred Julius
By Wm Wallace White
ATTY.

G. A. JULIUS.
RACE TOTALIZATOR.
APPLICATION FILED APR. 30, 1919.

1,409,216.

Patented Mar. 14, 1922.
5 SHEETS—SHEET 4.

INVENTOR:
George Alfred Julius
By Wm Wallace White
ATT'Y.

UNITED STATES PATENT OFFICE.

GEORGE ALFRED JULIUS, OF SYDNEY, NEW SOUTH WALES, AUSTRALIA.

RACE TOTALIZATOR.

1,409,216.

Specification of Letters Patent. Patented Mar. 14, 1922.

Application filed April 30, 1919. Serial No. 293,874.

*To all whom it may concern:*

Be it known that I, GEORGE ALFRED JULIUS, a subject of the King of Great Britain and Ireland, residing at Culwella Chambers, Castlereagh Street, Sydney, New South Wales, Australia, have invented new and useful Improvements in Race Totalizators, of which the following is a specification.

This invention relates to race totalizators of the type in which electrical circuits are selected on the operation of ticket issuing machines and electrical currents transmitted through such circuits are caused to operate electric mechanical apparatus usually located at a distance from the issuing booths, which mechanism includes means for totalling the electrical impulses and indicating the totals of the same on individual indicators respectively allocated to several competitors and also indicating the grand total of all the tickets issued.

In the accompanying drawings.

As will be hereinafter explained, the tens drum transmission mechanism, which corresponds in principle and substantially in structure with the units transmission mechanism, may be omitted from the system when the apparatus is required for use under circumstances calling for very small turnover and for operation at a limited rate. Where however, the volume of business to be recorded is substantial, and where it is required to issue some tickets at a relatively high price, as for instance at £5 each, whilst the bulk of the business is in tickets at 10/— and at £1/—/— each, it is most desirable to use the compound type of the apparatus, in order to avoid unnecessarily rotating the units drum and spinning it at an abnormally high speed in order to keep pace with a high rate of operation of ticket issuing machines connected thereto. The compound type of apparatus facilitates the handling of heavy and rapid business, inasmuch as the unit drum of the indicator is driven independently of the other indicator drums in the system, and the record of individual bets made at high figures is delivered directly to the tens drum and not thereto through the units drum. The units drum is thus relieved of an overload of transfer business. In the operation of these apparatus, under any usual working conditions, the units drum is rarely at rest and its record cannot be read with certainty except when a pause in the issuing of tickets occurs or when the issuing of tickets has ceased. When the business is more than ordinarily heavy, transmission to the tens drum from the units drum occurs so frequently that the figures on the tens drums also are rendered unreadable, and consequently, although the drums at any particular moment correctly indicate figures corresponding with the number or value of the tickets issued, the indicators cannot be read. It is rarely possible in any system, under working conditions, to make the figures of the unit drum available for observation whilst the issuing of tickets is in active progress, as that drum rarely comes to rest or pauses in its rotation. One important feature of the present invention is in the means, dependent on the winding and un-winding of a long coiled spring, whereby the indicator drums are permitted to speed up their rate of rotation gradually to a predetermined maximum rate, and to diminish it gradually from that rate as they approach their stopping positions. The normal speed of rotation of the drums is set by the speed applied by the primary drive to the indicator; that speed corresponds with the normal maximum rate at which recording impulses will be received from the ticket issuing machines.

The transmission system in the totalizator herein described is chiefly characterized in the fact that electrical impulses produced by plunging a selector arm in a ticket issuing machine are transmitted to an electro-magnet and are discharged from said magnet through a constantly rotating commutator into a circuit including a source of electrical energy and a grand total recording device in series with a circuit through a competitor total recorder and indicator connected to the selector contact on which the selector arm in the ticket issuing machine has been plunged. One such electro-magnet is associated with or forms part of each ticket issuing machine. Each collector serves a plurality of issuing machines and magnets. The commutator is a continuously rotating one adapted to successively close contacts, respectively connected to the circuits leading through several magnets. In practice, eight to ten contacts are found the most convenient and practical number to be used in each commutator to insure the best working results. The commutator is rotated at a rate which insures the release of the magnet impulses faster than the same can be repeated by manual operation of the selector arm in the ticket issuing machine, so as thereby to make it impossible to miss transmission to the indicator of the record of any ticket issued through such machine.

Figure 1:
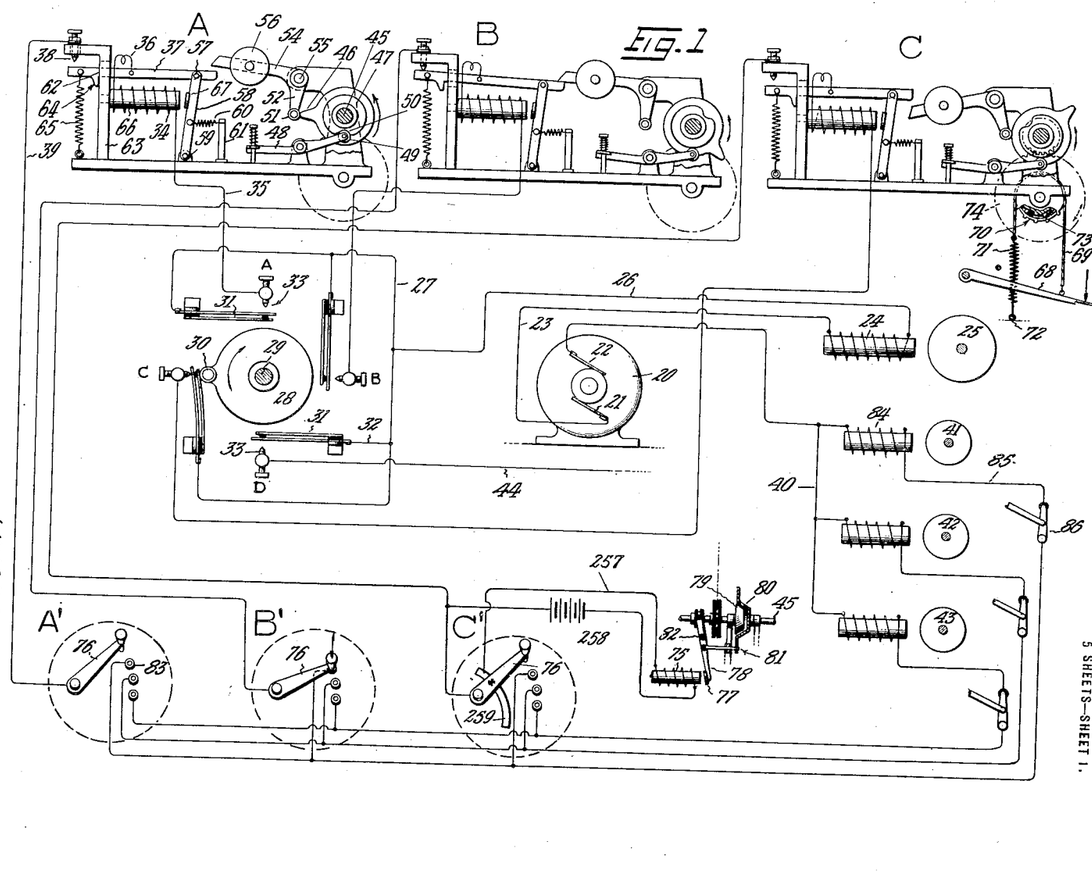
Fig. 1 is a diagrammatic view explanatory of the principle of the ticket issuing and impulse transmitting devices, showing the connection thereof to the competitor and grand total indicators.

In the diagrammatic arrangement (Fig. 1) explanatory of this characteristic feature of the system, the dynamo or other source of electrical energy 20 is maintained in rotation by a prime mover. Its brushes 21 and 22 are connected up to the circuit terminals as follows:—a line 23 from the brush 21 leads through the electro-magnet 24 of the grand total indicator 25 and thence through the return line 26 to the ring circuit 27 of the commutator. 28 is the rotor of the commutator. It is mounted on a shaft 29 which is maintained in rotation at a rate which opens and closes each individual contact at a faster rate than it is possible for a clerk to effect issues of tickets successively in a ticket issuing machine. The rotor 28 carries upon it a roller tappet 30 which is arranged to contact with the spring leaf contact makers 31 so as to close contacts therethrough upon each engagement therewith. The contact springs 31 are connected up by lines 32 to the ring circuit 27, and the contact posts 33 which the spring contacts 31 successively touch when struck by the tappet 30 are respectively wired to the coil windings 34 in the traps A, B, C, . . . by lines 35 and thence by flexible connections 36 to the trips 37. As will be hereinafter described, the trips 37 complete the circuit from the connecting wires 36 to the binding posts 38 and thence by the return lines 39 to the related issuing machines $A^1$, $B^1$, $C^1$, . . . The other brush 22 of the electric generator 20 is connected to a circuit line 40 into which are branched, in parallel, lines to the electro-magnets 84 of the competitor indicators 41, 42, 43, . . . In Fig. 1 the system is shown embodied in an equipment consisting of three ticket issuing machines $A^1$, $B^1$, $C^1$, each having three selector contacts, each of said machines being respectively connected to an impulse trap A, B, C, and each of said traps connected to a contact post 33 (marked also A, B, C, to correspond with the traps distinguished by those letters). The collector is shown fitted with a fourth contact point $33^D$ from which the line 44 (shown broken away) may be connected up to another trap (not shown) and through it to another ticket issuing machine (not shown). The collector is shown fitted with four contact making devices but each may be fitted with a less or greater number than four; in practice it is found convenient to fit the collectors with eight or ten contact making devices, so that it will successively make and break each of said contacts once in each rotation of its rotor 28. There may be used in the system a large number of ticket issuing machines— 40 or even a greater number—each equipped with any number of selector contacts required, as for instance 30 to 40.

The electro-magnetic trap will now be described. The form in which it is shown in the drawing does not represent the mechanical form in which it is constructed, but the essential principles of its structure are disclosed in the diagrammatic view. 45 is a shaft which carries a cam or tappet 46 and also carries a centering notch cam 47. A spring loaded lever 48 armed with a roller cam 49 engages the notch 50 in the cam 47 and thus operates to bring the shaft 45 and the tappet 46 to fixed zero position and thus correct any inequality of movement due to defectiveness in the driving devices, the object being to bring the tappet 46 into contact with the striker roller 51 on the tail 52 of the weighted bell crank lever arm 54, 55 being the fulcrum and 56 the counter-weight of this lever. The trip 37 is a bar which is pivotally mounted at 57 on an oscillating leg 58 which is supported on a foot pivot 59 and hung back to a post 61 by a tension spring 60. The outer end of this trip 37 is a floating fit in a guide slot 62 in a post 63 and it is formed with a lug 64 which acts as a stop to limit the action of the spring 60. The outer end of it is also held down by a spring 65 so that in the idle position the trip stands as shown at A. When tilted to close the circuit at 38 it takes up the position shown at B and after its release it falls after the counter-weighted lever has passed its heel as shown at C. The core 66 of an electro-magnet is mounted on the post 63, 34 being the winding of said magnet. 67 is an armature on the oscillating leg 58.

The trap shaft 45 is turned by manual, pedal, or power mechanism. In the case of manual drive a hand crank (not shown) is fitted to the shaft 45 with the object that a clerk may operate the trap by giving one complete turn to the crank. The pedal device is shown on the right side of the trap marked C, and consists of a pedal 68 having a chain 69 connected to it passing over a sprocket wheel 70 and anchored at its tail end by a spring 71 to a fixture 72. 73 is a free-wheel clutch within the sprocket 70. An impulse applied to the pedal 68 turns the sprocket wheel 70, and thence through the gearing 74 turns the shaft 45 one complete rotation. An automatic clutch device for applying a rotation to the shaft 45 is shown in connection with the ticket issuer $C^1$. In practice, an automatic clutch is used where possible. It consists essentially in an electro-magnet 75 in the circuit line 257 of a battery 258, one end of said line being connected to the selector arm 76 and the other end of it to a sector 259 with which the selector arm contacts when plunged thus to complete the circuit through the winding of the magnet 75. The generator 20 may be utilized instead of the battery 258 to energize the magnet 75, so long as the connections are appropriately arranged to avoid short circuiting the transmission lines. The magnet 75 is arranged to attract the armature 77 on a lever 78; said lever controls the movement of the clutch element 79; the counter-part clutch element 80 is connected to the shaft 45 directly or through gearing; 81 is a check latch carried on the lever 78; 82 is the fulcrum of the lever 78. When the magnet 75 is energized, the armature 77 is attracted and the lever 78 thus rocked on its fulcrum 82. In this rocking movement the latch 81 is released and the clutch engaged. Whilst its circuit through the magnet 75 remains complete, the clutch remains engaged, and the shaft 45 is turned, so that two or more tickets may be issued successively; but there may be gearing of a known kind associated with the latch 81 to effect the declutching automatically at the completion of each rotation of the shaft 45, so that a separate plunging movement on the selector arm 76 is required to effect a second or subsequent rotation of the shaft 45.

The operation of this part of the system is as follows:—Taking a representative case in which the selector arm 76 of the ticket issuer at $A^1$ is plunged on the No. 1 contact 83, the plunging on the said contact completes a circuit through the magnet 75 in the line 39 in the manner shown in connection with the selector of the ticket issuer $C^1$. The shaft 45 of the trap A is thus caused to rotate in the direction shown by the arrow. Immediately the tappet 46 passes from behind the roller 51, the lever 54 is forced down by the counter-weight 56, and its toe, bearing down on the heel of the trip 37 tilts the trip upward to the position shown in B. It remains on the heel of the trip holding the contact between the trip 37, which is constructed of conductive material, and the post 38, thus completing a circuit from the selector arm 76 through the line 39, contact point 38, trip 37, wire 36, magnet winding 34, and line 35, to the collector contact post $33^A$. As the collector rotor 28 is in constant rotation, the roller tappet 30 in passing the leaf spring contact $31^A$ forces up such contact, thus completing a circuit from the line 35 to the ring circuit 27 momentarily, the current passing from the circuit 27 through the line 26 to the grand total magnet 24 and thence by the line 23 to the brush 21 of the generator 20. The return circuit is completed from the brush 22 through the parallel line 40 through the electro-magnet 84 of the competitor indicator 41, and thence by the home line 85 through a cut-out switch 86 back to the issuing machine contact 83. Thus the grand total indicator 25 and the No. 1 competitor indicator 41 are operated simultaneously. When two or more issuing machines are connected up in the system so that any two or all of them may deliver their records to the same indicators, it is obviously not possible to connect their respective circuits to the one winding of the magnet 84; for if two or more of them happened to be operated to issue tickets on the same competitor simultaneously, the two impulses would reach the magnet 84 and also the magnet 24 simultaneously, and the indicators 41 and 25 would be advanced only one digit whilst as a matter of fact two or more tickets had been issued on independent issuing machines. It is for this reason that special provision must be made in the indicator elements of the equipment to permit the reception of simultaneous impulses on every indicator. The special means which will be hereinafter described for separately transmitting impulses to the indicators may be arranged, and in fact are usually arranged in such a way that certain issuing machines may be allocated for the issue of tickets at special prices, and the rotations applied to the indicator drums proportioned to the ticket values, so that the indicators exposed to view disclose not the actual number of tickets issued but the actual number of unit values contained in the tickets issued. It has been already explained that in practice it is found preferable to arrange the commutator with eight or ten contact making devices. The commutator is not required to have a number of contact points corresponding with the number of plunge points in the issuing machines because its function is to make contact at a pre-determined interval to complete the circuit from the issuing machine to which it is connected quite irrespective of the number of contacts on which the selector arm in the issuing machine may be plunged, the essential condition being that each such contact must be made and broken at a faster rate than the issuing operation could be repeated in the machine A¹, thus to insure that the issuing operation can never overtake the transmitting operation. Where however there are more than eight or ten issuing machines in the organization, more than one collector must be arranged to serve current to the electro-magnetic mechanism associated with the indicator drums. It will therefore be observed that the commutator feature does not involve any diminution in the possible speed at which tickets may be issued, but it insures that the impulse caused by the momentary passage of current which occurs when the selector arm is plunged will be transmitted to the magnet and discharged therefrom through the commutator to the indicators at a uniform rate. The electro-magnet is self-restoring. When the armature 67 is attracted, the heel of the trip 37 is drawn momentarily from under the toe of the lever 54, (this is soon about to happen at B), and permits that lever to fall to the position shown at C with its toe below the heel of the trip. When the circuit is broken at 33 and the armature 67 thus freed, the trip 37 is pulled out to normal position by the action of the spring 60. Meantime the shaft 45 continuing its rotation brings the cam 46 thereon again in contact with the striker roller 51 of the lever tail and thus raises the lever 54 again to the A position. The rotation of the shaft 45 is arrested by the catch roller 49 and also by the latch pin 81. In the upward movement of the lever 54 caused by the tappet 46 acting against the striker 51, the toe of the lever 54, which is formed angularly for this purpose engages the heel of the trip 37 and in passing it, pushes it momentarily outward and upward to find clearance for the upward movement of the lever 54. In this movement of the trip 37 no electrical action happens, and immediately the lever toe has passed it, it is drawn out again to normal position as shown at A.

Figure 9:
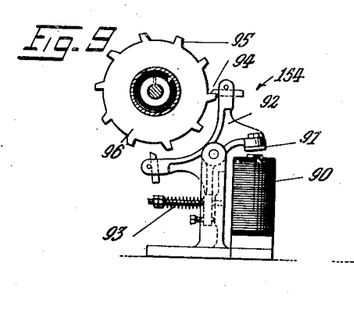
Fig. 9 is an end sectional elevation view of electro-magnetic escapement mechanism for permitting rotation of the transmission gearing in correspondence with variation in "flow" of impulses from the ticket issuing machines.

The current which passes to the indicator via the lines 26, 23, 40, and 85, is applied in the indicator apparatus to operate an electro-magnetic escapement of the type shown in Fig. 9. There is nothing intrinsically new in this escapement, as in substance it has been used already in known totalizators which include a number of escapement mechanisms associated with indicator devices. The electro-magnet 90 acts on an armature 91 which is carried on the escapement rocker 92, 93 being a spring which normally returns the rocker to the idle position with the armature 91 raised. The escapement rocker teeth 94 engage the teeth 95 of the scape wheel 96. The escapement mechanisms for permitting motion to the competitor drums and to the grand total drums are substantially identical in construction.

Figure 2:
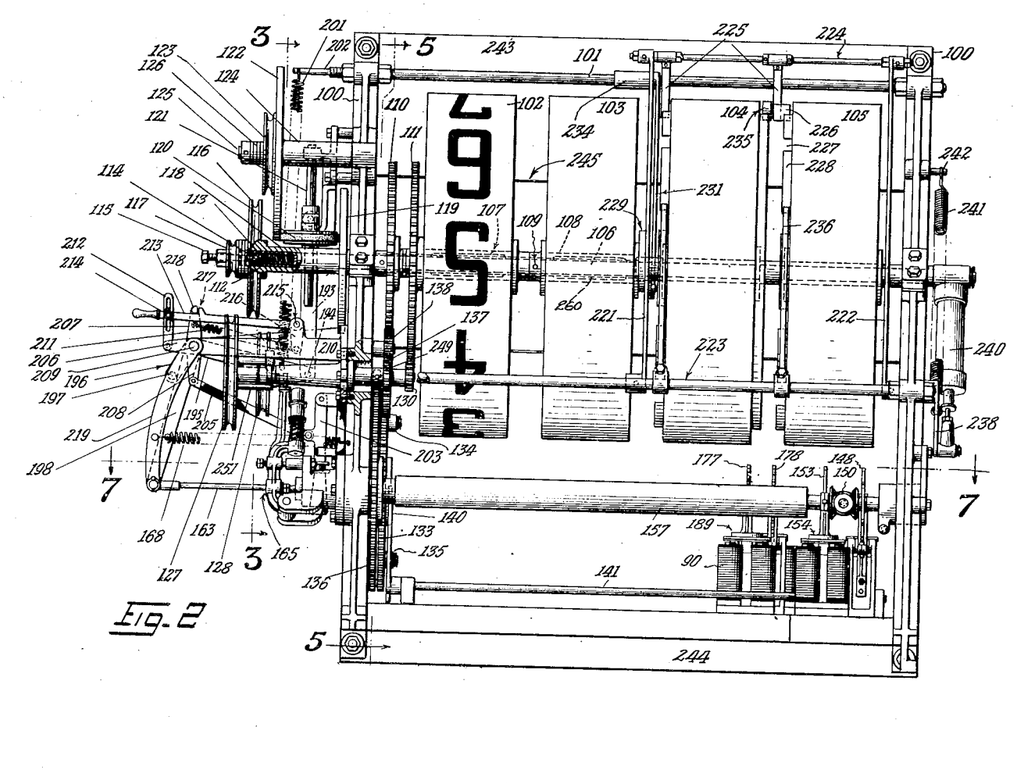
Fig. 2 is a sectional elevational view of a power driven indicator for either competitor totals or grand totals, including means for the reception of electrical impulses from a plurality of ticket issuing machines and means for mechanically storing motions corresponding with the number of impulses received, and delivering the accumulation of the said motions at a variably controlled rate to the indicator drums, and for effecting decimal progression motion from the units drum successively to the hundreds and the thousands drums in serial order.
Figure 3:
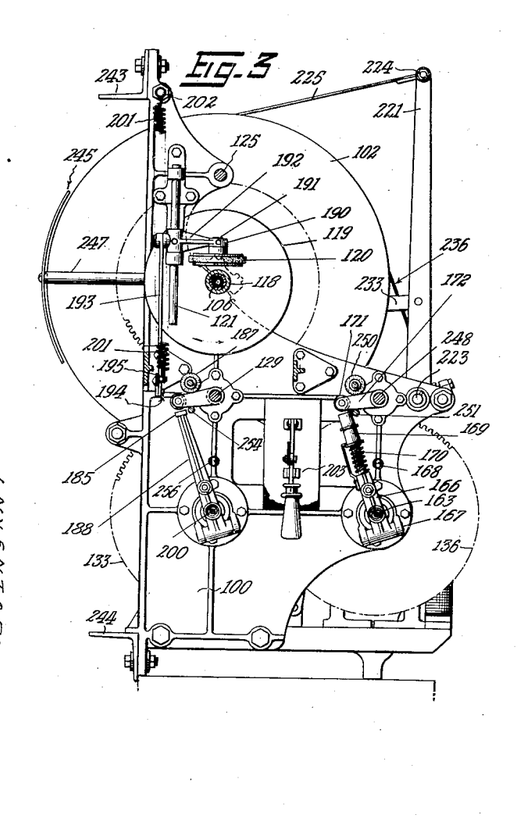
Fig. 3 is a transverse vertical section on line 3—3 (Fig. 2)
Figure 4:
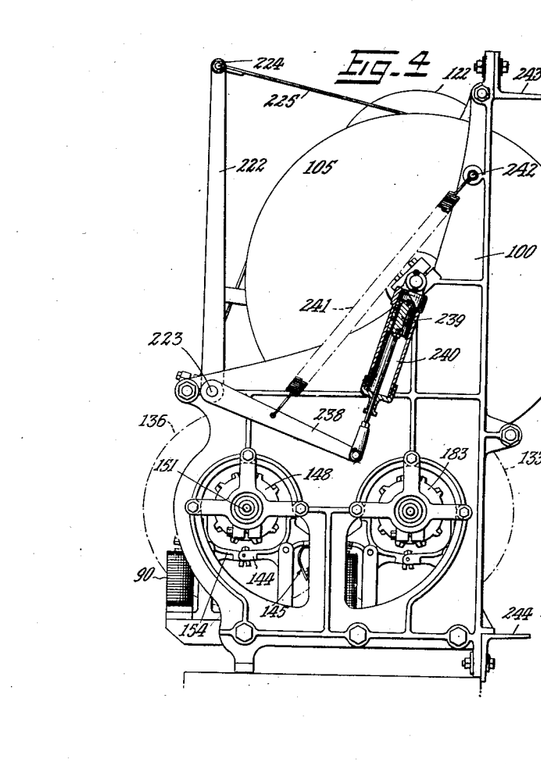
Fig. 4 is a rear end elevation relating to Fig. 2.

In the indicator, 100 are end frames connected together by thimble rods 101, forming therewith an open structure in which the mechanism of the indicator drums is mounted. The competitor indicators and the grand total indicators are identical in construction, but it is usual in the case of the grand total indicator to provide one drum more than in the competitor indicators in order to take care of the higher record invariably attained in the grand total. 102 is the unit drum, 103 the tens drum, 104 the hundreds drum, and 105 the thousands drum. It will be understood that the thousands drum may be omitted, or if necessary, a ten-thousands drum, and further a one hundred thousands drum may be added, the decimal progression connection between the drums higher than the thousands drum being substantially the same as the progression connection between the hundreds drum and the thousands drum which is herein described. 106 is a carrier shaft carried in bearings in the frames 100. The drums 104 and 105 and the higher drums, if any, are freely rotatable on this shaft. The tens drum is carried on a hub 108 which is pinned to a sleeve 260 which is freely rotatable on the shaft 106. The hub 107 of the unit drum 102 is freely rotatable on this sleeve.

Upon the other end of the sleeve 260 a toothed wheel 110 is fixed. To a flange on the end of the hub 107 to which the unit drum 102 is fixed, a toothed wheel 111 is fixed. The unit drum is therefore rotatable by means of the wheel 111, and the tens drum by means of the wheel 110. The shaft 106 is hollow at its outer end to form a pocket for a helical spring 112 which spring bears against a shoe 113 acting against a thrust ball 114 having a tension adjustment screw 115 behind it. The screw 115 passes through the hub portion of a double pulley 116—117 of which the member 116 is very much larger in diameter than the member 117. The hub of these pulleys is extended as a sleeve 118 which runs freely on the shaft 106 and carries at its inner end a friction disc 119. The spring 112 acts to push the pulleys 116—117 and their hub sleeve 118 outward, thereby also forcing the friction disc 119 outward along the shaft into surface contact with the intermediate friction pinion 120. Said pinion floats on a spindle 121 as will be hereinafter explained. Opposite to its place of contact with the driving friction disc 119, it bears against the face of the driven friction disc 122, which latter disc carries on the side of it a belt pulley 123. The disc 122 and wheel 123 are carried on a sleeve 124 which runs freely on a stud spindle 125, 126 being a ball thrust bearing. The outward tendency of the friction disc 119 causes the transfer pinion 120 to be tightly embraced between the friction discs 119 and 122. Primary driving motion at a uniform rate is applied to the belt pulley 116 and thence through the disc 119 and the transfer pinion 120 to the disc 122 and the belt wheel 123 thereon. The pulley 117 is connected to the pulley 127 by a belt under light tension. This belt slips when rotation of the wheel 127 is arrested, but the moment the wheel 127 is released, the belt becomes effective and rotation is transmitted by it to the wheel 127 from the wheel 117. Similarly the wheel 123 is connected by a loose belt with the belt pulley 128 and that pulley (128) has also associated with it means for arresting its motion and causing the belt to slip during the time that transmission of power thereto is not required. The belt wheel 116 is thus maintained in constant rotation whilst the pulleys 127 and 128 have motion applied to them only when certain devices hereinafter described operate to release them and so permit them to be rotated through their belt connections. It will be noted that the speed of operation of the machine is dependent upon the position in which the pinion 120 is for the time being set between the driving friction disc 119 and the driven friction disc 122. Inasmuch as the driving pulley 116 is turned at a uniform rate, the rate at which the disc 122 is moved will become greater as the pinion 120 is moved towards the centre of that disc, and vice-versa. Consequently the speed of the pulley 128 is variable but the speed of the pulley 127 is constant.

Figure 5:
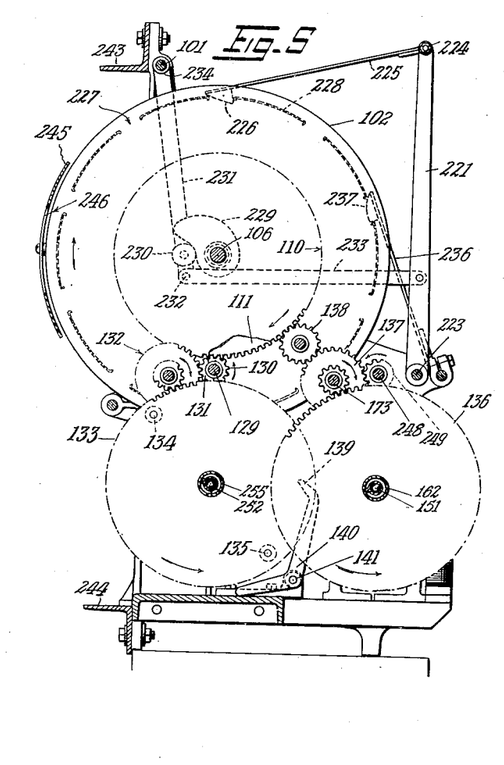
Fig. 5 is a transverse vertical section on the line 5—5 (Fig. 2)
Figure 6:
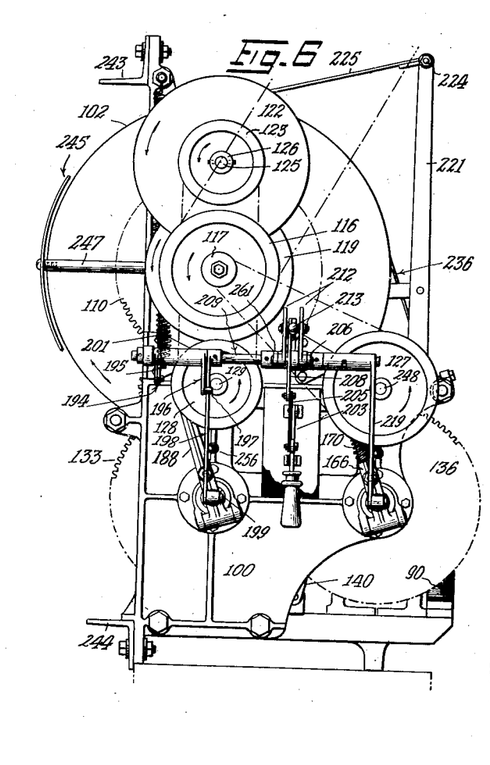
Fig. 6 is a front end elevation of the machine shown in Fig. 2.

The pulley 128 is keyed to a spindle 129 on which two spur pinions 130 and 131 are keyed. As shown in Fig. 5, the pinion 130 gears with the wheel 111 which controls the unit drum 102. The pinion 131 gears through a transfer spur wheel 132 with the gear wheel 133, the transfer wheel 132 being toothed so that the wheel 133 is geared down one-to-twenty. The wheel 133 is armed with two laterally offset roller tappets 134 and 135. For each ten complete rotations of the pinion 130, the wheel 111, which controls the unit drum 102, makes one complete rotation, whilst the wheel 133 during the same period makes one-half of a complete rotation. The driving pinion 249 on the shaft 248 is so geared through the transfer wheel 137 and the idle wheel 138 to the wheels 110 and 136, that ten rotations of the pinion 249 produce one rotation of the wheel 110, (which wheel controls the tens drum), and a one-half rotation of the wheel 136. There is clearance between the wheel 133 and the pinion 131, as these two parts must not intermesh directly. The offset tappets 134 and 135 engage the striker end 139 of a rocking lever 140 which is keyed to a rock shaft 141. In contacting with the striker 139, the tappets 134 and 135 thus cause a rocking movement of the rock shaft 141 twice in each rotation of the wheel 133, that is, once in each complete rotation of the wheel 111, and the units drum which is connected thereto. This rocking movement of the shaft 141 which occurs once every time the unit drum passes the zero position is utilized to operate mechanism associated with the tens drum to permit the tens drum to have a one digit or one-tenth movement on each such actuation. These means comprise an arm 142 on the shaft 141 with a screw adjustment 143 in the end thereof and an escapement rocker 144 with a tail 145 against which the adjustment pin 143 acts. The teeth 146 of this escapement rocker engage the teeth 147 of the scape wheel 148 which controls an epicyclic box the rotor element 150 of which is pinned to a long spindle 151. The other cheek wheel 152 of this epicyclic box carries on its hub a similar scape wheel 153. The scape wheel 153 is controlled by the electromagnetic escapement device 154 which corresponds with the device shown in detail in Fig. 9. 155 is a bearing collar fitted with a ball race 156 on which the end of a casing tube 157 is freely rotatable. A long helical spring 158 loosely contained in the tubular case 157 with the spindle 151 passing within it, is fixed to the collar 155 so that when said spring is wound up and the escapement connecting the epicyclic box above described is permitted to step by step advance, movement is applied from the spring to the epicyclic train through the bearing collar 155 and the epicyclic rotor 150. One end of the long spindle 151 is pinned to the epicyclic rotor 150 and its other end is fitted with a spline or feather 159 which runs in a slot in the bore of a hollow lead screw 160. This screw carries a coarse thread 161 externally and this thread works in the correspondingly tapped hub 162 of the wheel 136. The end of the lead screw 160 acts against the end of an extension rod 163. A collar 164 on the extension rod 163 bears against the open jaw 165 of a swinging chock 166 which is centred at 167. This chock is normally pulled inward by a spring 168 so that the buffer head 169 which is carried thereon sustained by the compression spring 170 stands clear of the off-set finger 171 on the arm 172; said arm is loosely rotatable on an extension of the spindle 248, on which the primary pinion 249 is mounted. An off-set contact finger 250 on the side of the wheel 127, having a cushion collar on it, bears against the arm 172. 251 is a stop pin to keep the arm 172 in the neighborhood of the cushioned finger 250. When the lead screw 160 is screwed home into the sleeve 162, the collar 164 forces out the swinging chock 166, bringing the buffer head 169 of same below the finger 171 and through the arm 172 and it thus arrests rotation of the primary pinion shaft 248, and so prevents rotation of the transmission gearing and consequently prevents rotation of the wheel 110 and the tens drum 103 which is driven thereby. At all times when the lead screw is run back in the sleeve 162 the spring 168 holds back the chock and leaves the gearing free to turn the tens drum. There is constant torsion tending to turn the drive wheel 110 until the lead screw advances and the buffer 169 engages the finger 171. Torsion is transmitted through the spring 158 to the epicyclic box, and when by any movement of that box resulting from movement of the cheek wheels or the rotor scape wheels the spindle 151 is permitted to turn, it draws back the lead screw, thus releasing the chock and permitting the shaft 248 to turn through a corresponding angle and so transfer motion to the tens drum proportionate to the escapement movement. The tens drum is permitted motion either as a result of rotations of the unit drum 102 causing operation of the mechanical escapement 174 (see Fig. 10) or as a result of the operation of the electro-magnetic escapement 154 (see Fig. 9) or as a result of both actions simultaneously. Each of these escapements is arranged to control independently the rotation of the spindle 151. The escapement 154 is actuated by current transmitted to it from a ticket issuing machine and the epicyclic box is turned proportionately to the escapement motions. The escapement 174 is mechanically operated through the shaft 141 to effect automatic decimal progression of the tens drum. There may be a group of escapements respectively associated with the cheek wheels and the rotors of epicyclic boxes connected in train with the epicyclic boxes shown in Figs. 2 and 7. The feature of permissively controlled rotations of elements of a totalizator indicator by escapements associated with elements of an epicyclic train is not new, but this known principle of construction is adapted to permit of the recording of ticket issuing machine operations direct on to the tens drum from any required number of such machines, whilst utilizing the same transmission system to take care of decimal progression of the tens drum following on completion of each full rotation by the unit drum.

Figure 7:
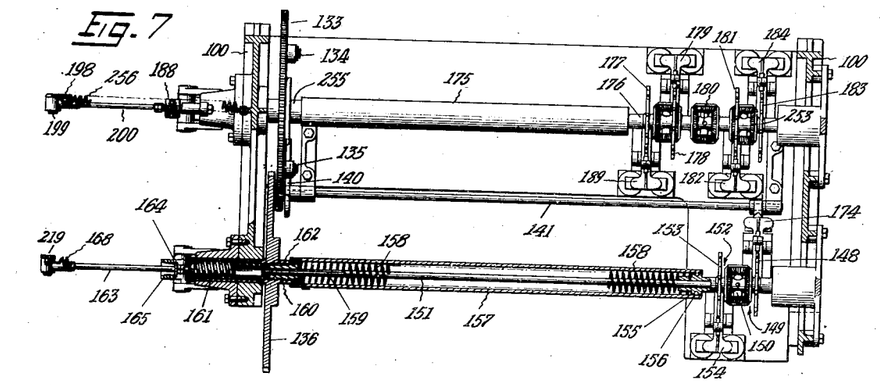
Fig. 7 is a sectional plan on the line 7—7 (Fig. 2)
Figure 8:
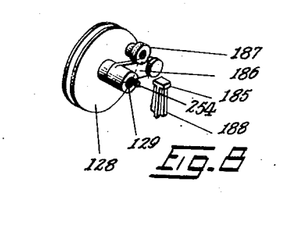
Fig. 8 is a detail perspective view explanatory of the arresting device for the indicator rotator gearing through which accumulated motions are transmitted from the motion storing mechanism to the indicator drums.
Figure 10:
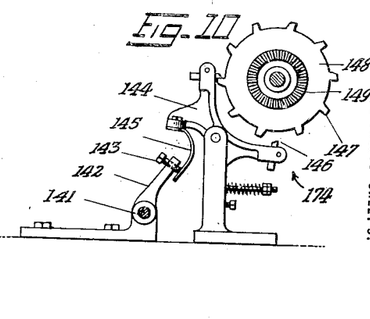
Fig. 10 is a similar view explanatory of a mechanical escapement which operates to effect transfer of decimal motion from the indicator units drum mechanism to mechanism associated with the indicator tens drum.

Transmission to the units wheel 111 through the pinion 130 is similarly controlled. In Fig. 7 an external view of the casing tube 175 which corresponds with the tube 157 is shown. The bearing collar 176 corresponds with the bearing collar 155. The scape wheel 177 is carried on the inner cheek wheel of the first epicyclic box in a three box epicyclic train. The rotor of this first box is freely rotatable on the spindle 252 and carries a scape wheel 178 which is controlled by the electro-magnetic escapement 179 (similar to Fig. 9). The rotor of the middle box is pinned at 180 to the spindle 252 which functionally corresponds with the spindle 151. The rotor of the last box of the train is freely rotatable on the spindle 252 and carries a scape wheel 181 which is controlled by the electro-magnetic escapement 182, and the scape wheel 183 which is controlled by the electro-magnetic escapement 184 is mounted on the outer cheek wheel 253. The construction and operation of this eyipcyle mechanism has already been fully described and illustrated in my prior United States Patent No. 1,280,754, dated October 8, 1918. The constant torsion which is sustained by the pinion spindle 129 applies motion continuously to the wheel 111 unless said motion is interrupted by the chock device 185. The device used in this case is not structurally identical with the stop device 169 already described in connection with the tens drum control inasmuch as it is not fitted with the buffer 169 and the back spring 170. It is shown in detail in Fig. 8. The shaft 248 turns at a more rapid rate than the shaft 129, and hence the necessity for fitting a resilient buffer on the chock which arrests its rotation. 186 is an arm freely rotatable on the spindle 129; 187 is a rubber collared off-set lug pinned on the side of the belt wheel 128, and 254 is a positioning pin corresponding with the positioning pin 251. The belt wheel 128 driven from the belt wheel 123 continues to rotate and to turn the spindle 129 and consequently to turn the unit drum through the gearing described, so long as the stop 185 is withdrawn inward, but when that stop is pushed outward, which occurs when the lead screw which works in the tapped sleeve 255, (corresponding with the lead screw 160) is screwed out to its full extent and pushes out the swinging arm 188. The stop 185 on the top of that arm comes into the path of the lug on the end of the arm 186 and arrests the rotations of the spindle 129 and arm 186, and consequently the spindle 129 is turned by means of the buffer lug 187 on the side of the wheel 128 until the arm 186 is checked by the stop 185, which happening, the belt drive on the wheel 128 slips. The spring contained in the case 175 being always more or less wound up the scape wheels are released when their respective escapement rockers are operated. At each release of an escapement the lead screw runs back on the tapper sleeve, effecting withdrawal of the stop 185; the gearing then again operates to turn the unit drum through an angle corresponding with the angular movement permitted the shaft through the escapement operation. It will be clear that the angular or rotational movement permitted to the shaft through the operations of the escapements will necessarily depend upon the scape wheel toothings and furthermore will depend upon whether the scape wheels are mounted on the rotors or on the cheek wheels of the epicyclic boxes. Assuming for instance that a uniform toothing, ten teeth, is adopted as shown in Figs. 9—10, then a one tooth movement of a scape wheel which is mounted on a rotor element will result in an angular movement of the shaft twice that which results from a similar scape wheel movement applied to a cheek wheel. In such a system of toothing therefore the escapements operating on the rotors may be connected to issuing machines which deliver tickets at a value of £1/—/— each whilst the escapements operating on the cheek wheels are connected to issuing machines producing tickets at 10/— each, and notwithstanding that the scape wheel teeth are equal in the two cases, the angular movement permitted the shaft 151 will be proportioned to the values of the tickets issued. By using scape wheels having a different number of toothings and controlling them from ticket issuing machines arranged to issue tickets at a corresponding value, the competitor indicators are qualified to indicate the gross values of any required range of values of tickets issued, and the sum of all such values on the grand total.

If the rate of transmission of impulses from the issuing machines to the indicators were approximately uniform, it would be unnecessary to make any provision for varying the speed of rotation of the indicator drums; but in practice it is found that there is an enormous difference in the rate at which tickets are called for, the demand being at some times slack and at other times, as just preceding the start of a race, so vigorous as to tax the manual capacity of a large number of clerks to operate the issuing machines. It is therefore essential to provide a means whereby under such conditions of heavy load the rotations of the indicator drums may speed up to keep pace with the business passing. It is practically essential that the drums should start up slowly and come to rest gradually; otherwise the mechanical stresses would be so great as to call for a massive construction of the mechanism which would be inconsistent with the conditions essential for permitting the necessary flexibility of operation. For this purpose means are therefore provided for speeding up the primary motive drive to keep pace with the flow of business automatically, so that it will turn only at a minimum speed sufficient to record the business ordinarily passing but will be speeded up to a very fast rate to operate the indicators under stress of heavy working conditions. This is accomplished by the mechanism which moves the transfer friction pinion 120 in relation to the driving and driven friction discs 119 and 122 respectively. The carrier collar 190 on the spindle 191 of the transfer pinion 120 is mounted in a bracket 192, said bracket being fixed to the slidable guide spindle 121. Said bracket and spindle are carried by a connecting link 193, the lower end of which is pin connected at 194 to a bell crank 195—196 having on its short arm 196 an offset finger 197 which acts against the back of the lever 198. The outer eye of said lever is pin connected at 199 to the end of the extension rod 200 which corresponds functionally with the extension rod 163. The carrier spring 201, which is tensionally proportioned to readily lift the pinion 120, connects the long arm of the bell crank 195—196 to the bracket 202. This spring opposes the action of the lever 198. When said lever is pushed outward it acts against the off-set lug 197 and forces down the arm 195 of the lever, thus, by means of the link 193, moving the transfer pinion 120 downward to the lower position shown in Fig. 2. In that position the speed of the belt wheel 128 is a minimum in relation to the uniform driving speed which is applied to the primary pulley 116. When, however, the lead screw in the barrel 175 moves inward thus permitting the extension rod 200 to retire and moving the swinging lever 198 inward, the transfer pinion 120 is raised by the spring 201 and ultimately reaches the uppermost position, where it is in contact with the driving disc 119 near the edge thereof. When so located the primary driving speed is stepped up so that it is thus made several times faster on the pulley 128 than in the other circumstances already referred to. Consequently, when owing to the augmented rapid operation of the escapements, the spindle in the barrel 175 turns so fast that the lead screw is brought inward, the rotational speed applied to turn the units drum increases at a very rapid rate and is maintained at that rapid rate until the indicator rate of recording overtakes the rate of transmission from the issuing machines, when the lead screw gradually works out again and at the end position forces out the extension rod 200 and so moves the bell crank lever 195—196 and draws down the pinion 120 towards the slow rate position. The rotational speed of the unit drum is thus at a minimum, and at the extreme outer position of the lead screw the swinging arm 188 moves outward, bringing its stop 185 into the path of the lug 186 and so arrests the rotation of the drum, at the same time holding the belt pulley 128 and so causing the belt driving same from the pulley 123 to slip.

A knife switch 203 is connected by an insulating link 205 to a lever, the arms of which are numbered respectively 207 and 208. This lever works midway of its length on a fulcrum pin 209 carried in the outer end of a bracket 210, and a spring 211 is hooked up to it to hold the insulating link 205 in tension and open the switch unless same be latched closed by the means now to be described. The arm 213 is mounted at 215 on a lug on the bracket 210, and a bell crank 216 forming part of the said arm 213 carries the back end of the spring 211. 217 is a trigger chock on the arm 213, and 218 is a laterally offset pin or lug on the arm 207 engageable with the trigger chock 217. On the spindle 209 on which the lever 207—208 is rotatably mounted there is also carried an arm 219 having a bell crank end 206 upon it. Pinned to the spindle 209 is a lever 198 having a bell crank arm 261. The outer end of the arm 219 is pin connected to the extension rod 163 of the lead screw 160 of the tens drum barrel 157. Similarly the outer end of the arm 198 is pin connected to the extension rod 200 of the lead screw of the units drum barrel 175. The two bell crank arms 206 and 261 each carry a slotted link. These slotted links are numbered 212. A cross pin 214 fixed in the lever 213 is located in the slots in these links 212, so that the links may work within a limit range, but on either of them completing its range of movement and engaging the pin 214 the link movement will be applied to the trigger arm 213. Thus the levers 198 and 219 whose movements are governed by the movements of the extension rods 200 and 163 respectively, operate to draw down one or other of the slotted links 212, so that upon either of those rods (200, 163) coming to its extreme inner position, the corresponding slotted link will engage the pin 214, and pull down the trigger arm 213 thus clearing the trigger chock 217 from the cross pin 218.

When this occurs the spring 211 pulls over the lever 207—208 and the switch 203 is opened by means of the insulated connecting link 205 which is controlled by the lever 207—208.

The lever 198 is hooked back to the frame 100 by a helical spring 256 in tension, and the lever 219 is similarly hooked back to the frame 100 by a helical spring 168 in tension. Either of these springs is effective for the purpose of pulling down the trigger lever 213 when the lead screw which acts against the extension rods 200 and 163 respectively, reaches the extreme inner position.

If at any time the rate of transmission to the tens or the units indicator drum should exceed the speed capacity of the drums to record the impulses reaching them respectively, or should the belts break or the power transmission be interrupted otherwise, one or other of the lead screws will be moved inwardly to the limit of its permitted range, at which the inward movement of the related extension rod (200 or 163) and the lever (198 or 219) will draw down one or other of the links 212 and thus draw the stop 217 clear of the off-set pin 218. As soon as the off-set pin 218 is thus cleared of the chock 217, the spring 211 operates to turn the lever 207—208 on the pin 209 and by means of the insulating link 205 to open the switch 203. This switch is the switch marked 86 in Fig. 1, and it will be readily understood that when that switch is opened the circuit to all the issuing machines from the indicator, the motion of which has been thus arrested, are rendered inoperative and the issuing machines can no longer be operated until the switch is restored. This condition is an extreme condition which would not occur in practice except under very abnormal operating circumstances or in the event of transmission failure, notwithstanding that the machine is designed with a length of lead screw and proportionate length of accumulator spring in the barrels 157 and 175 to take care of the heaviest rush of business which might be reckoned against in any normal working circumstances.

There is nothing substantially novel in the decimal progression mechanism through which motion is transmitted from the tens drum upwards through the higher drums in series. It comprises a rocking frame consisting of two arms 221 and 222 carried by a rocking spindle 223 and connected together by a cross rod 224 at the head. The rod 224 has hung upon it for the hundreds, thousands and subsequent drums, light arms 225 carrying drag pawls 226 adapted to engage in gaps 227 in rim flanges 228. The frame, consisting of the parts beforementioned, is reciprocated once in each rotation of the tens drum by means of a cam 229 acting against a contact roller 230 which is carried on a hanging bar 231 pivotally connected at 232 to the end of the connecting rod 233. The hanging bar 231 is pendularly supported on the frame head bar 101 on eyes 234. In order to prevent the thousands drums and the drums higher in series from being moved ahead by the drag pawls 226 except in their proper decimal progression, the pull rods 225 are fitted with riders 235 which run on joggled flanges on the preceding drums so that the pawls 226 cannot engage with the drum higher in series so as to apply a progressive movement to it except when the drum next below in series has attained the zero position. A spring lath 236 armed with a check pawl 237 is provided for each drum to prevent back kicking of same in the forward movement of the drag pawls 226.

The end of the rock shaft 223 to which the rocking frame arms 221—2 are fixed is fitted with a lever arm 238 on the outer side of the frame 100. This arm is connected to the piston 239 of a swinging dash pot 240. The lever 238 is also connected up by a tension spring 241 to the frame at 242. The spring 241 has sufficient tension to move the frame to advance the indicator drums, the cam 229 governing the motion and bringing back the frame for the pick up motion after the completion of each advance motion. The progressive motion applied to the drums by means of the spring as contra-distinguished from a direct mechanical drive which would necessarily operate with more or less suddenness and swift movement, minimizes risk of mechanical injury to the parts, whilst the quick return action of the drag arms 25 converts the step-by-step advance when rapid into a nearly continuous movement.

Heretofore it has been necessary to adapt the frame construction of these machines to suit the structure of the building in which they are housed. This has proved in practice a costly disadvantage and a cause of much practical inconvenience. As shown in the drawing, the frame ends are bolted up to longitudinal angle iron runners 243—244 which form convenient seatings for mounting the frame on the structure of a building so that the exposed figures on the indicator drums will be centred in a wall opening. The dial plate 245 pierced as shown at 246 to exhibit only the indicated figures is mounted on brackets 247 fixed to the end frames. This face or dial plate 245 makes a neat finish and fills a wall opening of considerable area, enabling the placing of the machine close up to the wall so as to make the figures on the drum peripheries more legible to on-lookers by bringing them as far forward in the wall aperture as practicable.

The operation of the system is as follows:—When for instance, in ticket issuing machine $A^1$, the selector arm 76 is plunged on the first ticket button 83, indicating competitor No. 1, the arm 76 is locked in contact with the button 83 until positively released by an electro-magnetic device, not shown, which forms part of the ticket issuing machine. Immediately after the arm has been plunged, the tappet 30 on the collector rotor 28 closes the contact between the spring 31 and the adjustable contact point 33. Meantime the clutch 79—80, or the alternative device consisting of a hand crank, not shown, or a pedal 68, turns the shaft 45 for one complete rotation, thereby allowing the counter-weighted lever 54 to drop and thereafter resetting it. The toe of this weighted lever drops on the heel of the trip 37 and tips up the trip and so closes a contact at 38. The circuit is only completed when the contact 31—33 is made after the trip 37 has been raised. Immediately the circuit has been closed in the way described, current passes through the magnet windings 34, energizing the core within them which then draws in the armature 67, thereby pulling back the trip and allowing the counter-weighted lever 54 to drop to the position shown at C. The trip 37 being now no longer held up, falls open, and the circuit is broken at 38. At the moment when the circuit was completed at 31—33, current from the dynamo 20 passes in series through the electro-magnet 24, which actuates the grand total indicator 25, and through the electro-magnet 84, which actuates the competitor indicator 41. Passing now to the indicator if it be assumed that the $A^1$ ticket issuing machine is arranged for issuing tickets at unit value, the magnet 84 would correspond with the magnets of the escapement mechanism (see Fig. 9) numbered in Fig. 7 as 184 and 189. If the ticket machine $A^1$ were arranged for the issue of tickets at double unit value then it would be wired up to the magnets represented at 179 or 182 Fig. 7, so that the oscillation of the escapement rocker would permit the scape wheel to move one tooth and permit the shaft on which the epicyclic boxes which carry the scape wheels are mounted angular movement of 18° or 36° as the case may be (assuming that in both cases 10-tooth escapement wheels are used). The drive transmitted from the prime mover to the belt wheel 116 and transmitted through the friction gear 119, 120, 122, and thence by slipping belt connecting the pulley 123 to the pulley 128, operates through the intermediate gearing to turn the unit drum 102. The spring in the barrel 175 being under tension transmits torsional movement to the epicyclic train, the movements of which are controlled by the several scape wheels 177, 181, 178, 183. The escapement train shaft controlling the lead screw locks the drive gear against rotation by bringing the chock 185 into position, until the epicyclic train has been permitted to turn by the release action of the escapement rockers. When so released it brings the lead shaft backward in the tapped sleeve in the hub of the wheel 133 thereby retiring the chock 185 and permitting rotation to the gear. As the gear rotates the lead screw is wound out and the chock 185 again comes into action, arresting the motion. Each complete rotation of the unit wheel is applied as one rocking impulse to the shaft 141, by the tappets 134—135 and through it to the mechanical escapement 174. The scape wheel 148 controlled thereby governs the rotative motion permitted the spindle 151 in the tens barrel 157, and operates to liberate the spindle 157 so that it may rotate proportionately to the number of impulses applied to it, and also controls the lead screw position and brings the buffer check into engagement with, or out of engagement from the control arm on the primary pinion spindle 248.

As many issuing machines as are in the system may be thus connected up to any one indicator, a separate escapement being provided in each such indicator for each group of ticket issuing machines associated with it through one collector. As has already been mentioned, some of these issuing machines may be arranged for the issue of tickets at unit value and others for the issue of tickets at a double or different ratio of unit value, but in the case of ticket machines arranged to issue tickets at high values it is more convenient and economical, so long as the value of such tickets is fixed at ten times the unit value, to transfer the record of same directly to the tens indicator without passing that record intermediately through the units indicator. It is for this purpose that the escapement 154 is provided in connection with the long spindle 151 in the tens barrel 157.

When the recording rate is low, the speed of rotation of the indicators is appropriately low, but when a heavy rush of business is encountered the rotational speed is accommodated by altering the gear ratio between the primary drive and the transfer gear. The high rate of rotation is maintained, however, only during a heavy demand condition, and when the indicators are nearing their terminal position, the rate of rotation is slowed up until ultimately it reaches the minimum rate as they approach the stopping point. The drums are thus started up and brought to rest with a minimum of shock and without loss of energy expended in an effort to suddenly overcome momentum or to check inertia. Under a condition of overload or failure of transmission, the switch arrangement described operates to break the circuit from the particular indicating machine to all the issuing machines electrically connected up to it, thereby arresting the issue of tickets on such machines until accumulated overload has been disposed of and indicated on the indicator drums, and the switch reset manually.

It is necessary to emphasize the importance of the arrangement of the impulse transmission system for the reason that it assures maximum rapidity of operation. The so-called impulse storing strap apparatus operates as rapidly as the ticket issuing operation can be performed mechanically, whilst the commutator collector makes and breaks the circuits at a still faster rate and thereby ensures the delivery up of each stored impulse before it can be overtaken by another one. It is not technically correct to define the operation of the trap as a storing of an impulse, but its function will be best conceived from that term of description. It is thrown into operation simultaneously with the plunging of the selector arm of the ticket issuing machine and it operates to hold a contact closed momentarily until the circuit is completed by the operation of the commutator collector, and immediately thereafter it is automatically re-set, and thereafter stands ready to repeat its action when the selector arm is again plunged. The timing of the action of the trap and the commutator collector in relation to the possible speed at which the ticket issuing operation can be repeated is such as to ensure the delivery up to the indicating elements of a current impulse practically instantly after the selector has been plunged in any ticket issuing machine in the system.

A certain, but very short period of time is necessary for each operation of the ticket issuing machine, but this period is long enough to allow of the functioning of the trap and the commutator collector and the indicator escapements. The rate at which tickets may be issued is therefore limited only by the dexterity of the clerks who operate the issuing machine selectors and by the rapidity of the mechanical action of the ticket issuing machines. However fast that rate may be, every ticket issuing operation is simultaneously recorded by electro-mechanical action in the competitor and grand total indicators and is displayed without pause as rapidly as the indicator drums can turn when liberated by such action, and the rate of rotation of the units drum is speeded up automatically to keep pace with the maximum rate of issue of tickets in the system.

Whilst the primary utility of totalizator apparatus such as hereinbefore described is for the recording of investments or bets on horse races, and is described as an apparatus for that purpose, it will be obvious that the same apparatus or similar apparatus may be utilized for the issuing of fare or admission tickets, and generally for the recording of actions, payments, or entries, in any case where it is required to procure a record or indication automatically and rapidly of the total of the same in particular orders or classes and of the grand total.

What I claim as my invention and desire to secure by Letters Patent is:—

1. The combination with an electromechanical totalizator including ticket issuing means adapted to issue tickets of various classes in each of a plurality of separately operable issuing machines, of a mechanically operated temporary contact holding trip associated with each ticket issuing means, a constantly rotating commutator having separate contacts to which said ticket issuing means are respectively electrically circuited through said trip, and electro-magnetic indicator mechanism to which said commutator is adapted to momentarily complete circuits, said circuits each including a source of electrical energy.

2. The combination set forth in claim 1, having means for speeding the commutator to successively make and break all the contacts therein in a shorter period than that required for one complete operation of any ticket issuing machine connected to it.

3. A device of the class described, comprising, in combination, indicating devices, a ticket-issuing system, means for imparting motion to the indicating devices, electrical circuits connecting the ticket issuing system with the indicator system and adapted for permissively controlling the operation of the indicator devices, a temporary contact-holding trip in the circuit of each ticket issuing machine adapted to be closed automatically when such machine is actuated and reopened and reset automatically before the ticket issuing operation is completed, and a constantly operating commutator adapted to permit a circuit to be momentarily established through it while said trip is closed, said commutator being adapted to make and break contacts in connecting circuits leading to electro-magnetically controlled indicators.

4. The combination with electro-mechanical totalizator apparatus comprising a plurality of ticket issuing machines each having an operating electrical contact for each class of ticket with lines connected respectively through corresponding class total indicators connected in multiple to one pole of a source of electrical energy, of a mechanically operated trip associated with each issuing machine and operating to temporarily close an electrical contact and hold the same closed during operation of such ticket issuing machine; a return circuit from each issuing machine contact maker through such trip contact to a commutator contact; said commutator contact being adapted for repeatedly closing and reopening at a faster rate than the rate of operation of the ticket issuing machines; and a return electrical circuit to the other pole of said source of electrical energy.

5. In an electro-mechanical totalizator, the combination of a plurality of ticket issuing machines each having associated therewith an automatically resetting temporary contact making trip, means for throwing said trip into operation simultaneously with the ticket issuing movement, a fast speed commutator having a contact for each ticket issuing machine in the installation, and electro-magnetic indicators adapted to be operated by electrical currents passing serially through contacts in each ticket issuing machine and trip and in said commutator.

6. In an electro-mechanical totalizator, a commutator comprising a rotor adapted to close and open a plurality of line contacts successively at a fast rate of speed, and an electrical connection to each contact therein from an issuing machine including means for temporarily holding a contact closed on such line until a circuit is established through and broken at the commutator contact, and electro-mechanical class indicators wired respectively to selector contacts on the issuing machines and in their return circuit paralleled to one pole of a source of electrical energy and a circuit connecting the commutator contacts in parallel through an epicyclic train to the other pole of the source of electrical energy.

7. In totalizator apparatus of the type herein described, a temporary contact making and holding device associated with each ticket issuing machine, said device comprising a contact making trip and a cam lifted gravity device for moving said trip to close its contact, and a re-setting magnet adapted for breaking the trip circuit immediately after a line connection therefrom to the indicator devices has been closed through a commutator which is adapted to open and close line circuits traversing the ticket issuing machines and class total indicators at a rate faster than that at which the ticket issuing machines operate.

8. In a totalizator apparatus of the type herein described, means associated with a selector arm therein adapted to close class selector contacts in a ticket issuing machine and controlled by the plunging of the said selector arm on any of said contacts, for mechanically operating a trip adapted to temporarily close an automatically resetting contact in a circuit from the plunged contact through a commutator, a source of current, and electro-mechanical indicator apparatus.

9. The combination with a plurality of ticket issuing machines each having a selector arm co-acting with a group of electric contacts respectively allocated to different classes of tickets issuable from such machines, of a mechanically operated trip, an electro-magnetic automatically resetting device associated with each such machine, means operated by said selector arms for actuating and controlling said trip and causing it to close a contact and temporarily hold it closed while said machine is delivering a ticket, a commutator having a constantly revolving tappet and a contact controlled thereby for each ticket issuing machine in the installation, a group of indicators operable respectively by electro-magnetic devices, the circuits of which are connected to the related contacts in said issuing machine, a source of electric current, and circuit connections between said ticket issuing machine, said trips, said commutator, said indicators, and said source of electrical current.

10. A totalizator indicator comprising a system of intergeared and coaxially mounted drums, means for applying torsional effort to said drums to rotate them when they are liberated, a wheel geared to one of said drums having a long hub sleeve internally threaded and carrying a lead screw with an extension spindle spline connected thereto, an epicyclic box having its rotor fixed on said spindle and a scape wheel on either or both elements of said box, a coiled spring terminally connected at one end to said wheel sleeve and at the other end to a cheek wheel of said epicyclic box, escapement actions operating on said scape wheels and controlled electrically in accordance with the operations of ticket issuing machines, and an arresting check controlled by the lead screw and adapted to permit rotation of said drums in correspondence with the rate of operation of said ticket issuing machines.

11. Totalizator indicator mechanism including a gear wheel in mechanical connection with the indicator drum system therein, driving means tending to turn said wheel constantly, said means including a slipping belt driven from a constantly rotating motor, and gearing associated with said wheel to control its motion and thereby control the motion of the indicator drums, said gearing acting on a lead screw and winding a coiled spring, said lead screw controlling mechanism which operates to arrest the rotation of the drums and said spring connected to an epicyclic box the elements of which carry scape wheels which are permitted motion by the action of escapement rockers electromagnetically controlled from ticket issuing machines.

12. Totalizer indicator apparatus characterized in that the indicator elements are rotated by means, including a slipping member and are permitted rotation by escapement mechanism controlled by the operation of ticket issuing machines, said escapement mechanism including an epicyclic box the rotor element of which turns a lead screw which operates an arresting device adapted when advanced to check rotation of the drums, one of the cheek elements of said box being connected through a coiled spring to a wheel hub sleeve in which the lead screw works, which wheel is intergeared with the indicator drum drive.

13. In a totalizator indicator, means for permissively controlling the rotation of the indicator drums, said means comprising a tapped sleeve intergeared to rotate with said drums and connected through a coiled spring to an epicyclic box the rotor of which turns a lead screw in said tapped sleeve, and an escapement associated with said epicyclic box and adapted to permissively control rotation thereof produced by rotation of said sleeve transmitted through said spring, said escapement mechanism being controlled by ticket issuing mechanism and said lead screw arranged to operate a check engageable with the gearing through which motion is applied to said coiled spring so as to withdraw said cheek and permit rotation of the drums thereby in correspondence with the escapement action.

14. In totalizator indicator control apparatus associated with means including a slipping member for applying rotational movement to the indicator drums from a constantly rotating element, a coiled spring terminally connected to a lead screw sleeve at one end and at the other end to an epicyclic box, in combination with a long lead screw connected through a spline shaft to said epicyclic box, rotor, with the lead screw sleeve geared to the associated indicator drum, and an arresting device set and retired by the lead screw motion operative when so set to lock said drum against rotation.

15. Control mechanism for motor driven elements of a totalizator indicator, characterized in that permissive movements are communicated thereto through escapements associated with epicyclic boxes, in that said boxes are turned by means of a coiled spring connection which allows the epicyclic box rotations to overrun the drum rotations, and in that the rotational difference is applied to operate a lead screw which works in a sleeve of a rotating member which connects the variable speed driving gearing and control gearing to the drums, whereby the drums are caused to accelerate their rotational speed in correspondence with the excess rate of epicyclic box rotations in relation to drum rotations thus to overtake the incoming motions, and are brought to rest by a check operated by said lead screw when the epicyclic box movements have been taken up by them.

16. A totalizator indicator having a plurality of indicator drums characterized in that the drums are intergeared serially to turn in decimal progression, but in such a way that registrations of high value may be transmitted directly to the tens drum from ticket issuing machines, concurrently with the transmission of registrations of unit value to the units drum from other ticket issuing machines.

17. A totalizator indicator as set forth in claim 16 characterized in that rotative motion is applied to the tens drum independently of the drive applied to the units drum, and that the units drum is operatively connected to the tens drum by transfer mechanism which includes an escapement mechanically actuated by a tappet once in each rotation of the units drum.

18. In operating mechanism for a totalizator indicator as set forth in claim 17, means for effecting movement of the tens drum consisting in an epicyclic box geared thereto having two scape wheels on different elements of it, one of said wheels being governed by an escapement actuated electromagnetically from a ticket issuing machine and the other governed by an escapement actuated mechanically by a tappet once in each rotation of the units drum.

19. In a totalizator indicator wherein the indicator drums are positively driven through gearing including a slipping member and their rotation is controlled by mechanism including escapements actuated by ticket issuing machines,—the combination of means whereby the rate of rotation of the drums is varied to correspond with the rate of issue of tickets in said ticket issuing machines, said means comprising a floating friction pinion in contact between a driving disc and a driven disc mounted on different centres, and mechanism for varying the position of said pinion in relation to the centres of said discs said mechanism including a lead screw working in a tapped sleeve, said sleeve being rotated to correspond with the speed of rotation of the drum system and said lead screw rotated to correspond with the speed of transmission of the register to the indicator from the ticket issuing machines, so that the lead screw is caused to float inward or outward in said sleeve and move said pinion.

20. A totalizator indicator wherein the drum driving system is intergeared to a wheel having a tapped hub sleeve carrying a lead screw and said lead screw is rotated at a speed to correspond with the rate of ticket issues, the speed of rotation of the indicator drums being assimilated to the rate of rotation of the registering devices by means of a floating friction pinion transmitting a drive between driving and driven discs mounted on different centres, said friction pinion being moved in relation to the driving and driven discs by mechanism controlled by the position of the lead screw in the sleeve.

21. In totalizator indicator apparatus, the combination with mechanism for applying decimal progression rotation to the indicator drums in decimal series, said mechanism comprising a rocking frame, pawl headed drag arms coacting with notched and joggled flanges on said drums, and a spring acting on said drag arms for imparting advance motion to said frame, a quick return motion being imparted thereto by cam action thereon, of a dash pot for braking said cam action, whereby shock is eliminated in the advance motion of the mechanism.

22. In a totalizator indicator electro-mechanically associated with ticket issuing mechanism and adapted for mechanically registering the issue of tickets simultaneously with the issue thereof,—the combination of means whereby over-loading of the indicating mechanism is prevented, said means consisting in a switch in an operating circuit traversing the ticket issuing machines connected to said indicator, and means dependent upon difference in rotational rate of the registering and indicating mechanism adapted for throwing said switch open and so temporarily locking the issuing machines when the registering rate exceeds the indicating rate.

23. The combination with totalizator indicating apparatus adapted for operation electro-mechanically from ticket issuing apparatus, including mechanical registering devices, and gearing associating the same with a decimal system of intergeared indicator drums, of means for opening the controlling circuits of the ticket issuing machines under conditions of overload of the registering mechanism and for arresting rotation of the indicator drums as soon as the register has been transferred thereto.

In testimony whereof I have signed my name to this specification.

GEORGE ALFRED JULIUS.

Witnesses:
W. J. HUMPHREYS,
H. C. CAMPBELL.